US012663992B2

(12) United States Patent
Burgess

(10) Patent No.: US 12,663,992 B2
(45) Date of Patent: Jun. 23, 2026

(54) PREDICTING A VECTOR LENGTH ASSOCIATED WITH A CONFIGURATION INSTRUCTION

(71) Applicant: SiFive, Inc., San Mateo, CA (US)

(72) Inventor: Bradley Gene Burgess, Sunset Valley, TX (US)

(73) Assignee: SiFive, Inc., Santa Clara, CA (US)

( * ) Notice: Subject to any disclaimer, the term of this patent is extended or adjusted under 35 U.S.C. 154(b) by 349 days.

(21) Appl. No.: 18/484,128

(22) Filed: Oct. 10, 2023

(65) Prior Publication Data

US 2024/0160446 A1 May 16, 2024

Related U.S. Application Data

(60) Provisional application No. 63/425,136, filed on Nov. 14, 2022.

(51) Int. Cl.
*G06F 9/30* (2018.01)
(52) U.S. Cl.
CPC ...... *G06F 9/30036* (2013.01); *G06F 9/30149* (2013.01)

(58) Field of Classification Search
CPC ..................... G06F 9/30036; G06F 9/30149
See application file for complete search history.

(56) References Cited

U.S. PATENT DOCUMENTS

| | | | |
|---|---|---|---|
| 6,549,987 B1 * | 4/2003 | Rappoport .......... | G06F 12/0846 365/49.16 |
| 2007/0143575 A1 * | 6/2007 | Jourdan ................ | G06F 9/3455 712/2 |
| 2021/0329251 A1 * | 10/2021 | Chen .................... | H04N 19/159 |
| 2024/0020119 A1 * | 1/2024 | Tran ...................... | G06F 9/3877 |

* cited by examiner

*Primary Examiner* — Zachary K Huson
(74) *Attorney, Agent, or Firm* — Kilpatrick Townsend & Stockton LLP

(57) ABSTRACT

Prediction circuitry may generate a vector length prediction associated with a configuration instruction prior to completion of execution of the configuration instruction. The vector length prediction may indicate a number of data elements on which a vector instruction will operate. In some implementations, the prediction circuitry can generate the vector length prediction by detecting a repeating pattern of vector lengths associated with earlier executions of the configuration instruction. In some implementations, the prediction circuitry can generate the vector length prediction by detecting decrements of an application vector length by a constant value.

20 Claims, 13 Drawing Sheets

1000

1002

GENERATE VECTOR LENGTH PREDICTION ASSOCIATED WITH CONFIGURATION INSTRUCTION PRIOR TO COMPLETION OF EXECUTION OF CONFIGURATION INSTRUCTION, WHEREIN VECTOR LENGTH PREDICTION INDICATES NUMBER OF DATA ELEMENTS ON WHICH VECTOR INSTRUCTION WILL OPERATE

600

| | Predictors (in priority order) | Match Threshold | Notes: | Frequency | Accuracy |
|---|---|---|---|---|---|
| A | Decrement AVL by vimax | 2 | If last decrement is vimax<vi<0 predict it.  If decrement<=0, predict vimax , 0 or 1 based upon last occurrence. | 66.59% | 100.00% |
| B | Decrement AVL by constant | 2 | If last decrement is vimax<vi<0 predict it.  If decrement<=0, predict vimax, 0, or 1 based upon last occurrence. | 2.92% | 100.00% |
| C | Vi pattern is Decamodal (10) | 4 | Example (10,4,9,3,8,2,7,1,6,5,10,4,9,3,8,2,7,1,6,5,10,4,9,3,8,) | 24.54% | 99.98% |
| D | Vi pattern is Ennemodal (9) | 7 | Example (9,4,8,3,7,2,6,1,5,9,4,8,3,7,2,6,1,5,9,4,8,3,7,2,6,1,5,) | 0.06% | 100.00% |
| E | Vi pattern is Octamodal (8) | 5 | Example (8,4,7,3,6,2,5,1,8,4,7,3,6,2,5,1,8,4,7,3,6,2,5,1,) | 0.02% | 98.33% |
| F | Vi pattern is heptamodal (7) | 7 | Example (7,3,6,2,5,1,4,7,3,6,2,5,1,4,7,3,6,2,5,1,4,) | None | - |
| G | Vi pattern is hexamodal (6) | 4 | Example (6,3,5,2,4,1,6,3,5,2,4,1,6,3,5,2,4,1,) | 0.02% | 95.76% |
| H | Vi pattern is pentamodal (5) | 3 | Example (3,5,2,4,1,3,5,2,4,1,3,5,2,4,1,) | 0.11% | 99.58% |
| I | Vi pattern is teramodal (4) | 2 | Example (3,5,2,4,3,5,2,4,3,5,2,4,3,) | 0.04% | 97.60% |
| J | Vi pattern is trimodal (3) | 5 | Example (3,4,2,3,4,2,3,4,2,3,4,2,3,4,2,) | 0.01% | 100.00% |
| K | Vi pattern is bimodal (2) | 4 | Example (5,4,5,4,5,4,5,4,) | None | - |
| L | Vi pattern is Alternating predict/stall | 4 | Example (31,30,31,29,31,28,31,27,31,26,31,25,31,24,) | 0.003% | 100.00% |
| M | Vi is constant | 1 | Example (4,4,4,4,4,4...) | 0.22% | 97.42% |
| N | Do Not Predict | | Simply stall at decode or issue. | 0.52% | |

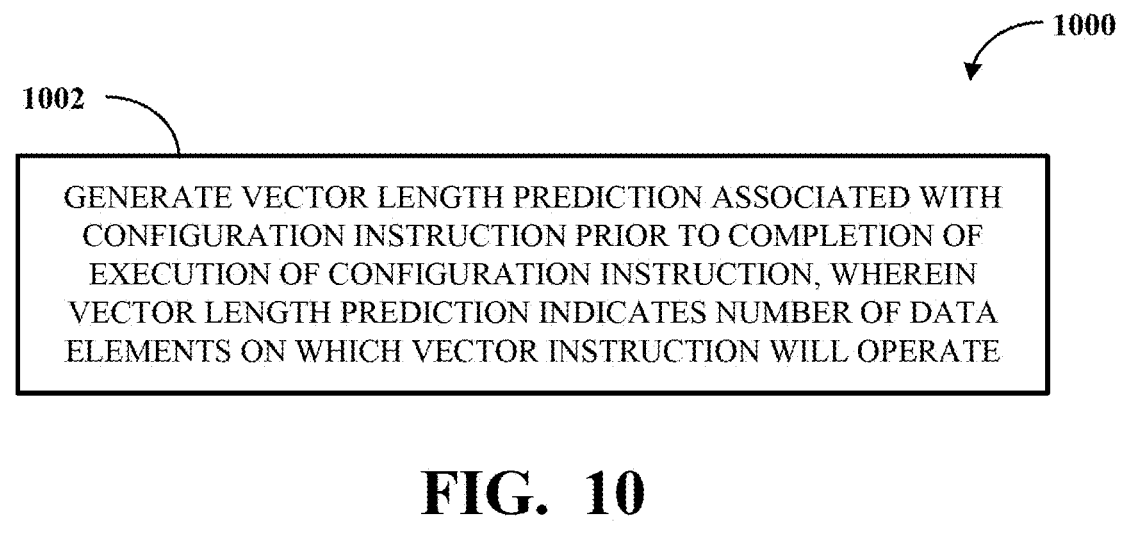

GENERATE VECTOR LENGTH PREDICTION ASSOCIATED WITH
CONFIGURATION INSTRUCTION PRIOR TO COMPLETION OF
EXECUTION OF CONFIGURATION INSTRUCTION, WHEREIN
VECTOR LENGTH PREDICTION INDICATES NUMBER OF DATA
ELEMENTS ON WHICH VECTOR INSTRUCTION WILL OPERATE

FIG. 10

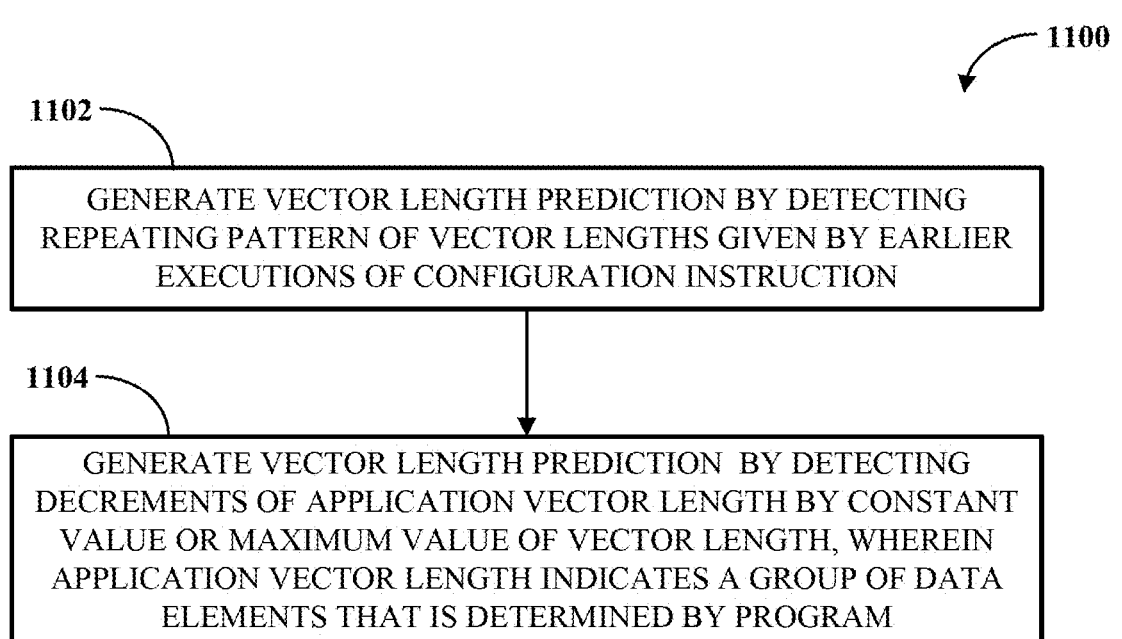

1100

1102

GENERATE VECTOR LENGTH PREDICTION BY DETECTING
REPEATING PATTERN OF VECTOR LENGTHS GIVEN BY EARLIER
EXECUTIONS OF CONFIGURATION INSTRUCTION

1104

GENERATE VECTOR LENGTH PREDICTION BY DETECTING
DECREMENTS OF APPLICATION VECTOR LENGTH BY CONSTANT
VALUE OR MAXIMUM VALUE OF VECTOR LENGTH, WHEREIN
APPLICATION VECTOR LENGTH INDICATES A GROUP OF DATA
ELEMENTS THAT IS DETERMINED BY PROGRAM

FIG. 11

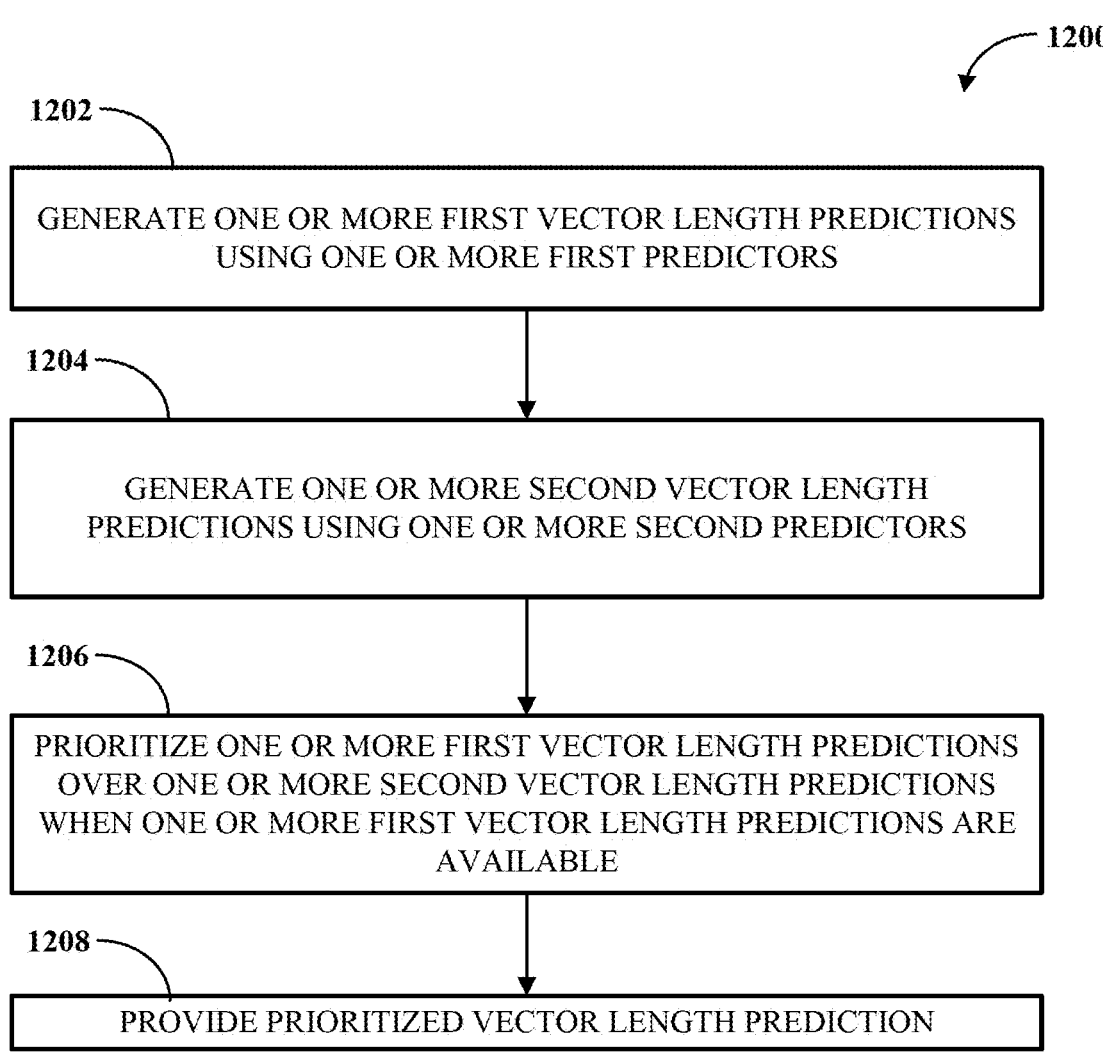

1200

1202

GENERATE ONE OR MORE FIRST VECTOR LENGTH PREDICTIONS
USING ONE OR MORE FIRST PREDICTORS

1204

GENERATE ONE OR MORE SECOND VECTOR LENGTH
PREDICTIONS USING ONE OR MORE SECOND PREDICTORS

1206

PRIORITIZE ONE OR MORE FIRST VECTOR LENGTH PREDICTIONS
OVER ONE OR MORE SECOND VECTOR LENGTH PREDICTIONS
WHEN ONE OR MORE FIRST VECTOR LENGTH PREDICTIONS ARE
AVAILABLE

1208

PROVIDE PRIORITIZED VECTOR LENGTH PREDICTION

FIG. 12

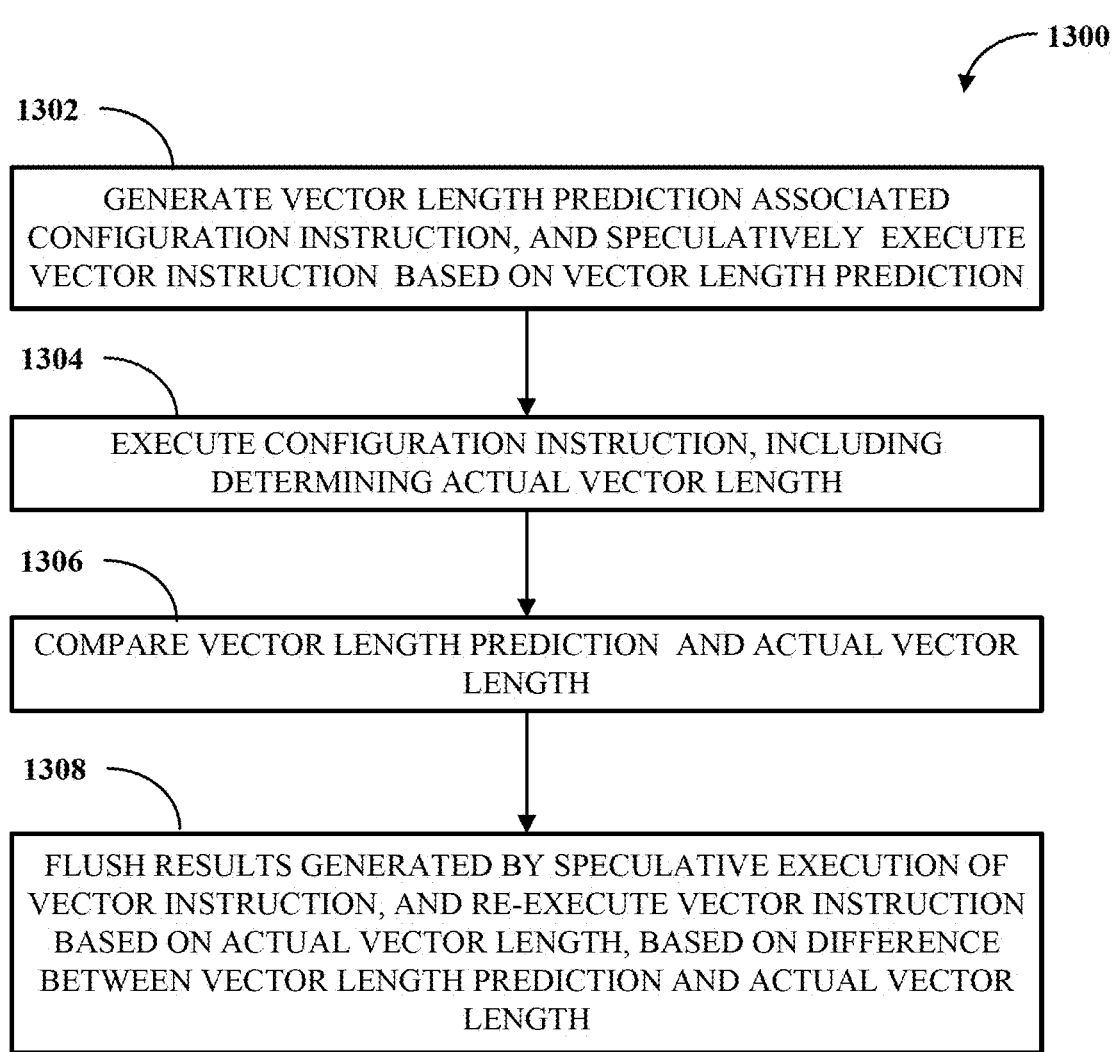

1300

1302

GENERATE VECTOR LENGTH PREDICTION ASSOCIATED CONFIGURATION INSTRUCTION, AND SPECULATIVELY EXECUTE VECTOR INSTRUCTION BASED ON VECTOR LENGTH PREDICTION

1304

EXECUTE CONFIGURATION INSTRUCTION, INCLUDING DETERMINING ACTUAL VECTOR LENGTH

1306

COMPARE VECTOR LENGTH PREDICTION AND ACTUAL VECTOR LENGTH

1308

FLUSH RESULTS GENERATED BY SPECULATIVE EXECUTION OF VECTOR INSTRUCTION, AND RE-EXECUTE VECTOR INSTRUCTION BASED ON ACTUAL VECTOR LENGTH, BASED ON DIFFERENCE BETWEEN VECTOR LENGTH PREDICTION AND ACTUAL VECTOR LENGTH

FIG. 13

PREDICTING A VECTOR LENGTH ASSOCIATED WITH A CONFIGURATION INSTRUCTION

CROSS-REFERENCE TO RELATED APPLICATION(S)

This application claims priority to and the benefit of U.S. Provisional Patent Application Ser. No. 63/425,136, filed Nov. 14, 2022, the entire disclosure of which is hereby incorporated by reference.

TECHNICAL FIELD

This disclosure relates generally to integrated circuits and, more specifically, to predicting a vector length associated with a configuration instruction.

BACKGROUND

A processor may be implemented with a scalar core (also referred to as an "integer unit") and a vector unit connected to the scalar core. The scalar core may have one or more scalar execution units in instruction pipelines for executing scalar instructions which operate on one data element at a time. The vector unit may have a vector instruction queue and one or more vector execution units for executing vector instructions which operate on multiple data elements at the same time. In operation, the scalar core may fetch, decode, execute, and retire scalar instructions, and may fetch and dispatch vector instructions to the vector unit for execution by the vector unit. The vector unit, in turn, may receive the vector instructions from the scalar core and may queue, execute, and retire the vector instructions.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is a table including examples of prediction circuitry.

FIG. 10 is a flow chart of an example of a technique for predicting a vector length associated with a configuration instruction.

FIG. 11 is a flow chart of an example of a technique for predicting a vector length based on repeating pattern and predicting a vector length based on a decrement behavior.

FIG. 12 is a flow chart of an example of a technique for predicting a vector length by prioritizing multiple predictions.

FIG. 13 is a flow chart of an example of a technique for a flush operation.

DETAILED DESCRIPTION

Figure 1:
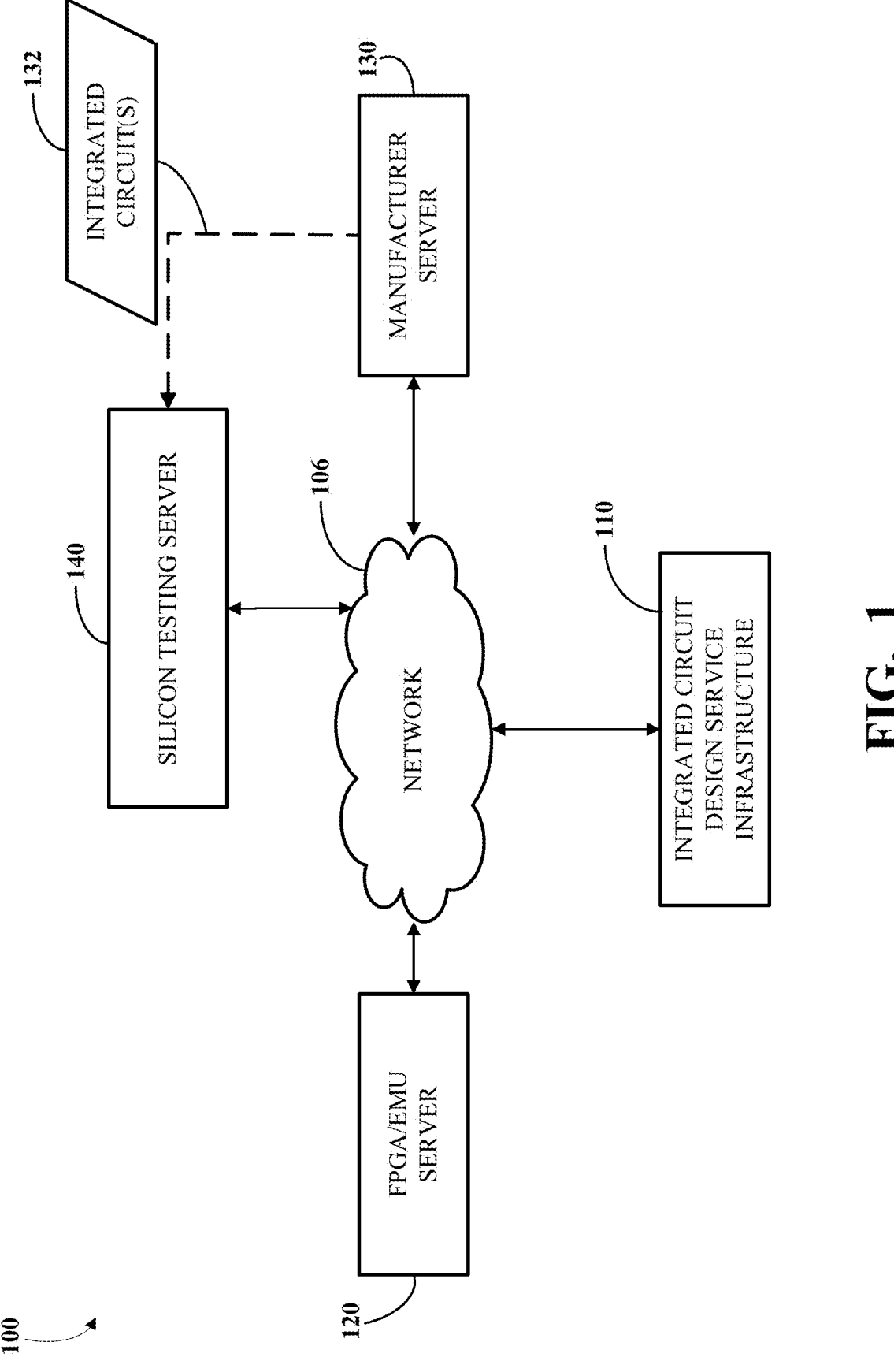
FIG. 1 is a block diagram of an example of a system for facilitating generation and manufacture of integrated circuits.

The vector unit may include multiple vector registers in a vector register file. The vector registers may be used by vector instructions to execute vector operations, such as loading, multiplying, accumulating, and storing data elements associated with one-dimensional data arrays. A vector register may have a bit length implemented in hardware (e.g., $V_{LEN}$), such as 128 or 256 bits. The vector unit can support a configuration instruction (e.g., vsetvli, defined by the RISC-V vector extension) to define how data elements may be stored in the vector registers. The configuration instruction can define a vector length (VL) that indicates a number of data elements on which a vector instruction subsequent to the configuration instruction in a program will operate. The configuration instruction can also define a selected element width (SEW) for the data elements, such as 8, 16, 32, or 64 bits. The configuration instruction can also define a length multiplier (LMUL) for the vector registers (e.g., to indicate a number of vector registers that may be grouped when executing a vector instruction), such as 1, 2, 4, or 8.

In a program, a configuration instruction can be executed multiple times at different addresses indicated by a program counter (PC) in various portions of the program. For example, a first configuration instruction could be executed at a first address to define the VL for a first vector instruction that operates on a 64-bit floating point number. Execution of the first configuration instruction could cause one or more micro-operations associated with the first vector instruction to be tagged with the VL that is determined by the first vector instruction (e.g., so that the one or more micro-operations can be executed by the vector unit based on the determined VL). Then, a second configuration instruction could be executed at a second address to define the VL for a second vector instruction that operates on 16-bit indexed memory accesses (e.g., scatters and gathers). Execution of the second configuration instruction could cause one or more micro-operations associated with the second vector instruction to be tagged with the VL that is determined by the second vector instruction (e.g., so that the one or more micro-operations can be executed by the vector unit based on the updated VL). The first vector instruction at the first address and/or the second vector instruction at the second address could be executed multiple times in the program, such as when either instruction is in a loop.

In some cases, execution of the configuration instruction can may depend on immediate value to define the VL (e.g., a static configuration instruction). In such cases, the configuration instruction can execute relatively efficiently with low latency. However, in other cases, execution of the configuration instruction may depend on executing another instruction to determine another value for defining the VL (e.g., a dynamic configuration instruction). For example, execution of the configuration instruction could involve executing a load instruction in the integer unit to determine the VL. In such cases, the configuration instruction can stall while waiting for the load instruction to execute. This can cause latency by delaying execution of subsequent vector instructions until the dynamic configuration instruction completes execution.

Implementations of this disclosure are designed to reduce latency associated with executing a configuration instruction at a specified address in a program (e.g., a dynamic configuration instruction) by predicting a VL to be defined by the configuration instruction. Prediction circuitry may be configured to generate the VL prediction associated with the configuration instruction prior to completion of execution of the configuration instruction. The VL may indicate a number of data elements on which a vector instruction subsequent to the configuration instruction in the program will operate. The prediction circuitry may generate the VL prediction by using one or more classes of predictors, and/or one or more predictors per class, with predictions from predictors being prioritized with respect to one another.

In some implementations, the prediction circuitry can include a class of predictor to detect repeating patterns of VL's associated with earlier executions of the configuration instruction. For example, the prediction circuitry could include one or more modal predictors that include a history buffer (e.g., a first FIFO data structure) and a threshold buffer (e.g., a second FIFO data structure). The history buffer can store VL's resulting from one or more earlier executions of the configuration instruction. The threshold buffer can store matches between VL's following executions of the configuration instruction. Based on a predetermined number of matches indicated by the threshold buffer, the prediction circuitry can generate the VL prediction from a VL in the history buffer.

In some implementations, the prediction circuitry can include a class of predictor to detect decrements of an application vector length (AVL). Like the VL, the AVL may indicate a group of data elements on which a vector instruction subsequent to the configuration instruction will operate as configured by the program. For example, a program may use the AVL when processing data elements in an image file. However, unlike the VL, the program may configure the AVL, including without determining a maximum value of the VL (VLMAX) that may be available by hardware (e.g., the program can configure the AVL to be greater than the VL). This may enable the program to be hardware agnostic (e.g., able to execute on different implementations of the hardware, including differences with respect to $V_{LEN}$). In some implementations, the prediction circuitry can detect decrements of the AVL by a constant value. In some implementations, the constant value could be the maximum value of the VL.

For example, the prediction circuitry could include a decrementing predictor that includes a history buffer (e.g., a first FIFO data structure) and a threshold buffer (e.g., a second FIFO data structure) for monitoring an AVL decrement behavior (e.g., decrements by the constant value). The history buffer can store AVL's resulting from earlier executions of the configuration instruction. The threshold buffer can store matches between decrements of the AVL following executions of the configuration instruction (e.g., in a loop, such as when processing a row of data elements in an image file). Based on a predetermined number of matches indicated by the threshold buffer, the prediction circuitry can generate the VL prediction to be the maximum value of the VL. As a result, latency associated with defining a VL for use by a vector instruction in a program may be reduced.

To describe some implementations in greater detail, reference is first made to examples of hardware and software structures used to implement a system for predicting a vector length associated with a configuration instruction. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-5, 7, and 8.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit (s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
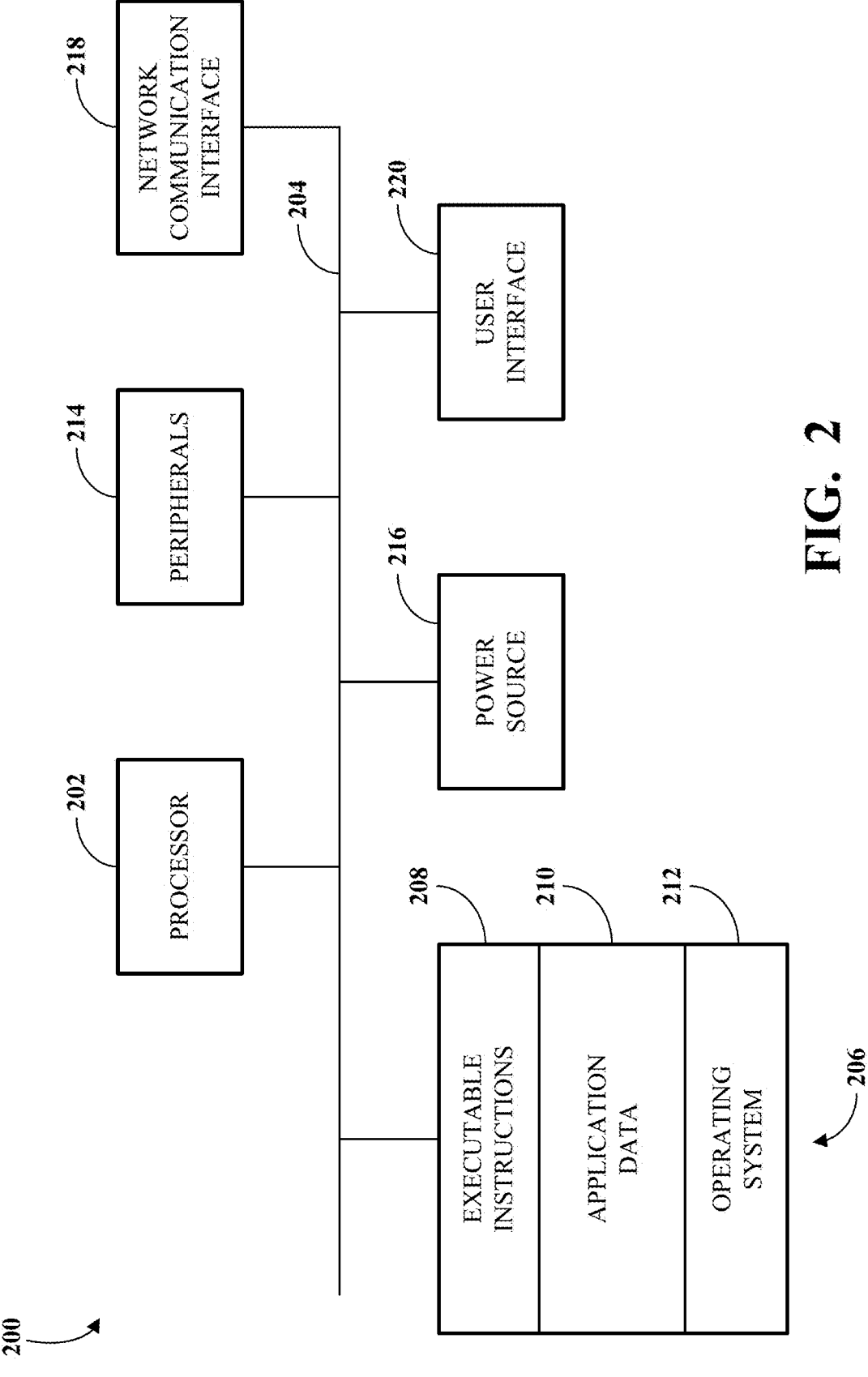
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-5, 7, and 8.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
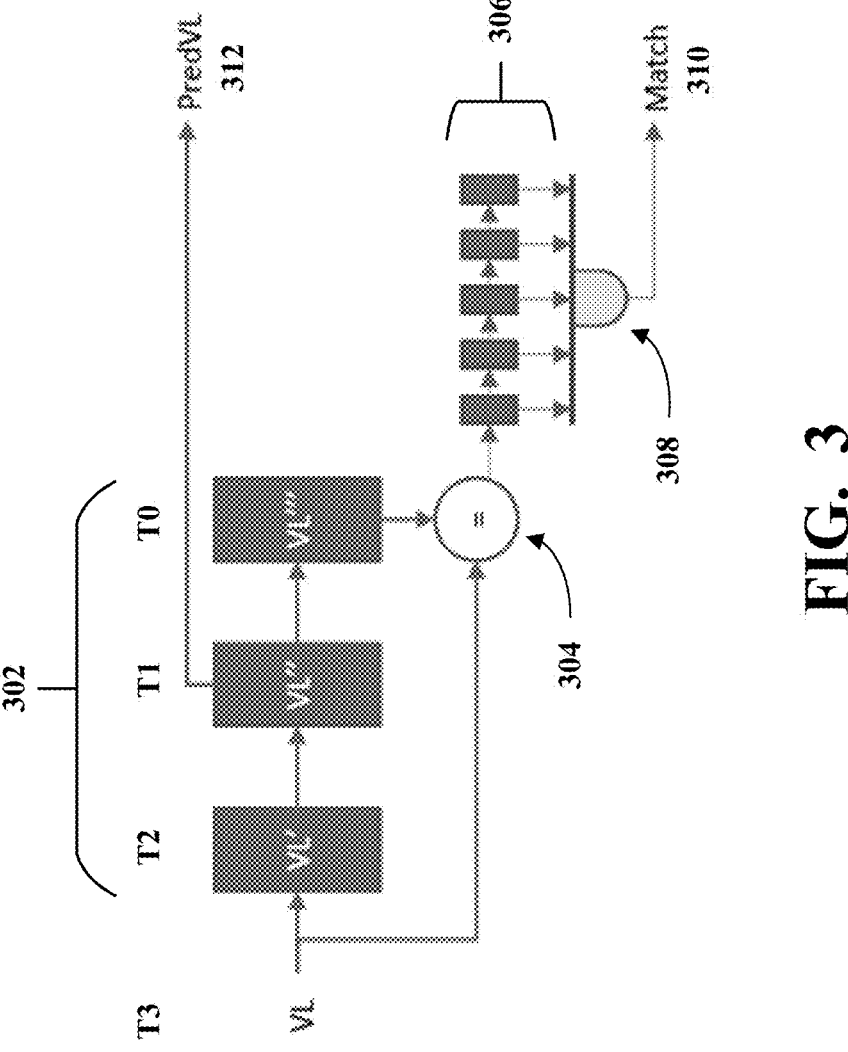
FIG. 3 is a block diagram of an example of first prediction circuitry.

FIG. 3 is a block diagram of an example of first prediction circuitry 300. The first prediction circuitry 300 may be configured to predict a VL associated with a configuration instruction in a program prior to completion of execution of the configuration instruction in the program. For example, the configuration instruction could be a vsetvli instruction, defined by the RISC-V vector extension, used to define how data elements may be stored in vector registers associated with the vector unit. The configuration instruction could define a VL that indicates a number of data elements on which a vector instruction subsequent to the configuration instruction in the program will operate. The first prediction circuitry 300 could be part of a first class of predictor (e.g., modal predictors) that predicts the VL by detecting repeating patterns of VL's associated with earlier executions of the configuration instruction at a specified address (e.g., pattern detection circuitry). For example, the first prediction circuitry 300 could be a trimodal predictor.

The first prediction circuitry 300 may include a history buffer 302, a comparator 304, a threshold buffer 306, and a match gate 308. The history buffer 302 can store one or more VL's resulting from one or more earlier executions of the configuration instruction at the same address. For example, the history buffer 302 could be a first FIFO data structure. A FIFO (first in, first out) refers to a system for storing data, such as a data buffer, in which an oldest or first entry into a queue is processed first out of the queue. The history buffer 302 in this example includes three entries (e.g., trimodal) for storing VL resulting from three earlier executions of the configuration instruction. For example, the history buffer 302 may store VL''' (e.g., resulting from an earliest execution of the configuration instruction, or an oldest entry, occurring at T0), VL'' (e.g., resulting from a next earliest execution of the configuration instruction, occurring at T1), and VL' (e.g., resulting from a next earliest execution of the configuration instruction, occurring at T2). Each time the configuration instruction executes at the same address, a VL (e.g., resulting from the current execution of the configuration instruction) is shifted into the history buffer 302.

The comparator 304 can compare the VL resulting from the current execution of the configuration instruction (e.g., VL, occurring at T3) with the VL''' resulting from the earliest execution of the configuration instruction (e.g., VL''', occurring at T0). When the comparator 304 detects a match between the VL resulting from the current execution and the VL''' resulting from the earliest execution, a match bit (e.g., 1) may be shifted into the threshold buffer 306. When the comparator 304 fails to detect a match between the VL resulting from the current execution and the VL''' resulting from the earliest execution, a mismatch (e.g., 0) may be shifted into the threshold buffer 306. The threshold buffer 306 can store one or more match bits resulting from matches between VL's resulting from the executions of the configuration instruction at different points in time (e.g., results from three executions apart). For example, the threshold buffer 306 could be a second FIFO data structure. In the present example, the threshold buffer 306 includes five entries for storing a possible five match bits. When the threshold buffer 306 is filled with consecutive match bits (e.g., match bits indicating 11111), the match gate 308 (e.g., an AND gate receiving inputs from entries of the threshold buffer 306) can generate a match signal 310. The match signal 310 may indicate that a VL prediction 312 has been generated by the first prediction circuitry 300, which may be associated with a next execution of the configuration instruction. The VL prediction 312 can be taken from an entry in the history buffer 302, such as from the second entry in the history buffer 302 (e.g., VL'', occurring at T1) for the trimodal predictor. Thus, based on a predetermined number of matches indicated by the threshold buffer 306, the first prediction circuitry 300 can generate the VL prediction from a VL in the history buffer 302 (e.g., VL'', occurring at T1). In some implementations, the number of bits associated with the threshold buffer 306 may be configured by firmware (e.g., firmware could configure the second prediction circuitry 400 to selectively use one or more of the entries, including in various patterns, to generate the match signal 312).

Figure 4:
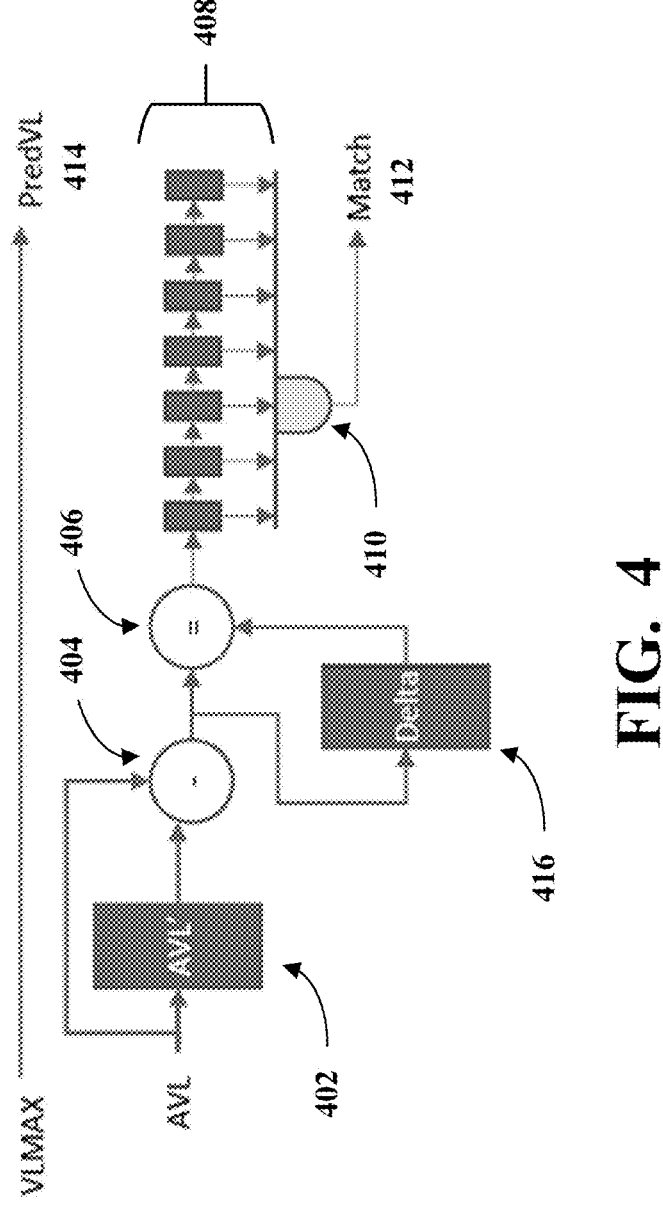
FIG. 4 is a block diagram of an example of second prediction circuitry.
Figure 5:
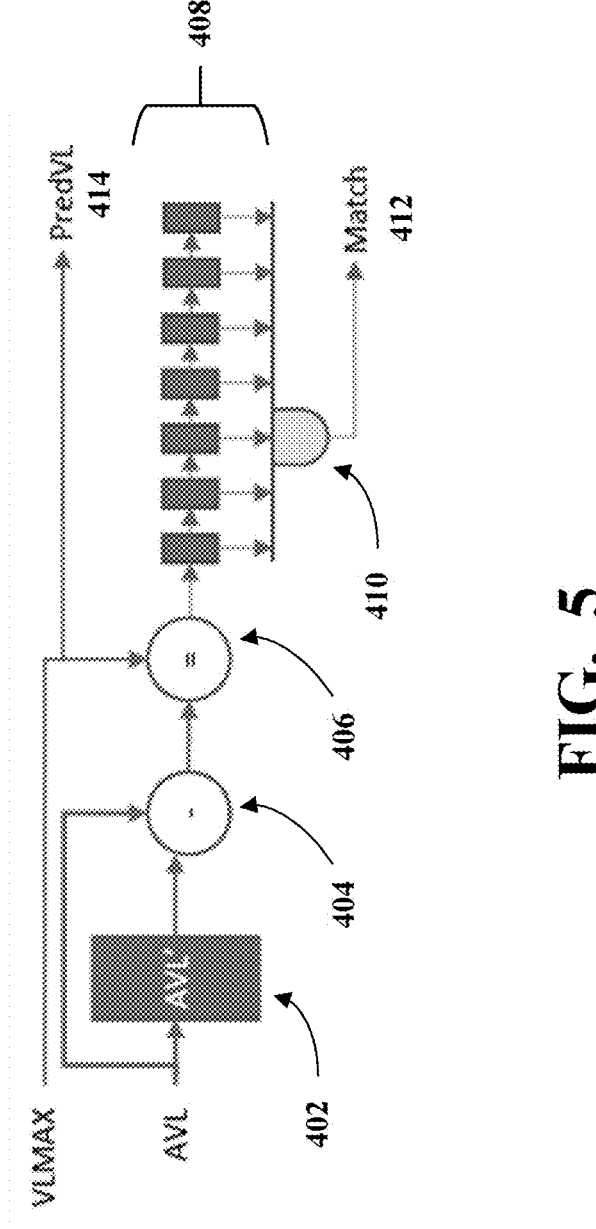
FIG. 5 is a block diagram of another example of third prediction circuitry.

FIG. 4 is a block diagram of an example of second prediction circuitry 400. The second prediction circuitry 400 may be configured to predict a VL associated with a configuration instruction in a program prior to completion of execution of the configuration instruction in the program. For example, the configuration instruction could be the vsetvli instruction, defined by the RISC-V vector extension, used to define how data elements may be stored in vector registers associated with the vector unit. The configuration instruction could define the VL that indicates a number of data elements on which a vector instruction subsequent to the configuration instruction in the program will operate. The second prediction circuitry 400 could be part of a second class of predictors (e.g., decrementing predictors) that predicts the VL by detecting decrements of an AVL by a constant value (e.g., decrement detection circuitry). The AVL may indicate a group of data elements on which a vector instruction subsequent to the configuration instruction will operate as configured by the program. The program may configure the AVL without determining the maximum value of the VL that may be available by hardware. This may enable the program to be hardware agnostic (e.g., able to execute on different implementations of the hardware, such as differences with respect to $V_{LEN}$).

The second prediction circuitry 400 may include a history buffer 402, a subtractor 404, a comparator 406, a threshold buffer 408, a match gate 410, and a decrement buffer 416. The history buffer 302 can store one or more AVL's resulting from one or more earlier executions of the configuration instruction at the same address. For example, the history buffer 402 could be a first FIFO data structure. In this example, the history buffer 402 includes one entry for storing AVL', which may be an AVL resulting from an earlier execution of the configuration instruction (e.g., a prior AVL). Each time the configuration instruction executes at the same address, an AVL (e.g., resulting from the current execution of the configuration instruction) is shifted into the history buffer 402.

The subtractor 404 can subtract the AVL', resulting from the earlier execution of the configuration instruction, from the AVL resulting from the current execution of the configuration instruction to determine an AVL decrement (e.g., an amount by which the AVL resulting from the current execution of the configuration instruction has decremented from the previous execution of the configuration instruction). The AVL decrement can be stored in the decrement buffer 416 (e.g., this value may be a delta, which may be a candidate for the constant value). On a subsequent execution of the configuration instruction, the comparator 406 can compare an AVL decrement that follows the current execution of the configuration instruction (e.g., from the subtractor 404) with the AVL decrement that followed the earlier execution of the configuration instruction (e.g., the delta stored in the decrement buffer 416). When the comparator 406 detects a match between the AVL decrement following the current execution of the configuration instruction and the AVL decrement following the earlier execution of the configuration instruction, a match bit (e.g., 1) may be shifted into the threshold buffer 408. The threshold buffer 408 can store matches between decrements of the AVL following executions of the configuration instruction.

For example, the configuration instruction may execute at the same address multiple times in a loop, such as when processing a row of data elements in an image file. The match bit may indicate the AVL decrementing by a same amount in successive executions of the configuration instruction in the loop. Thus, the match bit may reflect that the AVL decrement that is stored in the decrement buffer 416 is a constant value (e.g., at least through two consecutive executions of the configuration instruction at the same address).

When the comparator 406 fails to detect a match between the AVL decrement following the current execution of the configuration instruction and the AVL decrement following the earlier execution of the configuration instruction, a mismatch (e.g., 0) may be shifted into the threshold buffer 408. The threshold buffer 408 can store one or more match bits resulting from matches between the AVL decrement and the AVL decrement stored in the decrement buffer 416 at different points in time (e.g., results from one execution apart). For example, the threshold buffer 408 could be a second FIFO data structure. In the configuration shown, the threshold buffer 408 includes seven entries for storing a possible seven match bits. When the threshold buffer 408 is filled with consecutive match bits (e.g., match bits indicating 1111111), the match gate 410 (e.g., an AND gate receiving inputs from entries of the threshold buffer 408) can generate a match signal 412. The match signal 412 may indicate that a VL prediction 414 has been generated by the second prediction circuitry 400 for a next execution of the configuration instruction. The VL prediction 414 may be the maximum value of the VL. Thus, based on a predetermined number of matches indicated by the threshold buffer 408 (e.g., based on detecting decrements of the AVL by the constant value), the second prediction circuitry 400 can predict the VL to be the maximum value of the VL. In some implementations, the number of bits associated with the threshold buffer 408 may be configured by firmware (e.g., firmware could configure the second prediction circuitry 400 to selectively use one or more of the entries, including in various patterns, to generate the match signal 412).

In some implementations, the second prediction circuitry 400 may be simplified by comparing an AVL decrement that follows a current execution of the configuration instruction (e.g., from the subtractor 404) with the maximum value of the VL that may be available by hardware (e.g., VMAX, which may be a bit length of a vector register for storing one or more data elements of the number of data elements, such as the value of $V_{LEN}$). With additional reference to FIG. 5, third prediction circuitry 500 simplifies the second prediction circuitry 400 by removing the decrement buffer 416. In this case, the comparator 406 can compare the AVL decrement with the maximum value of the VL. When the comparator 406 detects a match between the AVL decrement following the current execution of the configuration instruction and the maximum value of the VL, a match bit (e.g., 1) may be shifted into the threshold buffer 408. The match bit may indicate the AVL decrementing by the maximum value of the VL in successive executions of the configuration instruction (e.g., in the loop). When the comparator 406 fails to detect a match between the AVL decrement following the current execution of the configuration instruction and the maximum value of the VL, a mismatch (e.g., 0) may be shifted into the threshold buffer 408. When the threshold buffer 408 is filled with consecutive match bits (e.g., match bits indicating 1111111), the match gate 410 can generate the match signal 412. The match signal 412 may indicate that the VL prediction 414 has been generated by the third prediction circuitry 500, which may be associated with a next execution of the configuration instruction. The VL prediction 414 may be the maximum value of the VL. Thus, based on a predetermined number of matches indicated by threshold buffer 408 (e.g., based on detecting decrements of the AVL by the maximum value of the VL), the third prediction circuitry 500 can predict the VL to be the maximum value of the VL.

FIG. 6 is a table 600 including examples of predictors A to M in a priority order. One or more of the predictors A to M may be used in prediction circuitry to predict a VL associated with a configuration instruction prior to completion of execution of the configuration instruction. The predictors A to M may belong to multiple classes of predictors. For example, the predictors A and B may belong to the second class of predictors (e.g., decrementing predictors) that detect decrements of an AVL, and the predictors C to K may belong to the first class of predictors (e.g., modal predictors) that detect repeating patterns of VL's. When multiple ones of the predictors A to M are used, multiple predictions of the VL may be generated, and a highest priority prediction of the VL that may be available (e.g., generated by the highest priority predictor that is implemented) may be used for the prediction (e.g., the VL prediction associated with the configuration instruction).

For example, in the second class, the predictor A (e.g., detecting decrements of the AVL by a maximum value of the VL) could be a highest priority predictor implemented in the prediction circuitry. For example, the predictor A could include the third prediction circuitry 500. A VL prediction from the predictor A, when available (e.g., indicated by a match signal), may be used to generate the VL prediction as a prediction above any other VL prediction's from any other predictor. Also in the second class, the predictor B (e.g., detecting decrements of the AVL by a constant value) could be a next highest priority predictor implemented in the prediction circuitry. For example, the predictor B could include the second prediction circuitry 400. A VL prediction from the predictor B, when available (e.g., indicated by a match signal), may be used to generate the VL prediction as a prediction above a VL prediction from the predictors C-M, but not above a VL prediction from the predictor A.

In the second class, in a Notes column of the table 600, bolded and underlined numbers indicate examples of VL prediction's following training on earlier determined VL's (e.g., not bolded or underlined). The predictor C (e.g., a decamodal predictor for detecting repeating patterns of VL's) could be a next highest priority predictor implemented in the prediction circuitry. For example, the predictor C could be similar to the first prediction circuitry 300 (e.g., the trimodal predictor), but with a history buffer that includes ten entries (e.g., decamodal) for storing VL's resulting from ten earlier executions of the configuration instruction. A VL prediction from the predictor C, when available (e.g., indicated by a match signal), may be used to generate the VL prediction above a VL prediction from the predictors D-M, but not above a VL prediction from the predictor A or the predictor B. Also, in the second class, the predictors D to K may be like the predictor C, but with history buffers having progressively fewer entries for storing VL's resulting from earlier executions of the configuration instruction. For example, the predictor I (e.g., a trimodal predictor for detecting repeating patterns of VL's, like the second prediction circuitry 400), may be like the predictor C but with a history buffer that includes three entries (e.g., trimodal) for storing VL's resulting from three earlier executions of the configuration instruction.

The predictor L (e.g., a predictor for detecting a repeating alternating pattern of VL's) could have a lower priority than the first and second classes of predictors (e.g., a lower priority than the predictors A to K). For example, the predictor L could be similar to the first prediction circuitry 300, but with a match gate (e.g., the match gate 308) that receives inverted alternating inputs from the threshold buffer (e.g., from the threshold buffer 306, such as match bits indicating 10101 or 01010, where every other bit is inverted so that that match gate 308, an AND gate, can generate the match signal 314 based on the alternating pattern). This may enable predicting every other VL in a sequence. In some implementations, this could be extended for other patterns, such as predicting every two VL's then stalling, predicting every three VL's then stalling, and so forth.

The predictor M (e.g., a predictor for detecting a constant VL) could have a lower priority than the predictors A to L. For example, the predictor M can predict that the next VL will be the same as the previous VL. A VL prediction from the predictor M, when available (e.g., indicated by a match signal), may be used to generate the VL prediction as a prediction below a VL prediction from the predictors A to L. Lastly, a path N may provide a path for no prediction at all (e.g., there is no VL prediction available from any of the predictor A to M). This may result in a stall pending completion of execution of the configuration instruction in the program to determine the VL.

Figure 7:
FIG. 7 is a block diagram of an example of fourth prediction circuitry.

FIG. 7 is a block diagram of an example of fourth prediction circuitry 700. The fourth prediction circuitry 700 may include multiple predictors for predicting a VL associated with a configuration instruction in a program prior to completion of execution of the configuration instruction in the program. For example, the fourth prediction circuitry 700 may include pattern detection circuitry 702 and decrement detection circuitry 704.

The pattern detection circuitry 702 may include prediction circuitry that detects repeating patterns of VL's, like the first prediction circuitry 300. For example, the pattern detection circuitry 702 could implement the predictors C to M. The pattern detection circuitry 702 may include a history buffer 705 (e.g., like the history buffer 302), multiple threshold buffers 706 (e.g., ones like the threshold buffer 306), and a pattern based prediction selector 708. The history buffer 705 may include ten entries for storing VL's resulting from up to ten earlier executions of the configuration instruction. This may enable different entries of the history buffer 705 to be used by different ones of the predictors C to M. For example, the predictor C (e.g., decamodal) might use the ten entries of the history buffer 705 (e.g., "PrevVLa" to "PrevVLj"), while the predictor I (e.g., trimodal) might use the first three entries of the history buffer 705 (e.g., "PrevVLa," "PrevVLb," and "PrevVLc"). The multiple threshold buffers 706 may correspond to the multiple predictors in the pattern detection circuitry 702, such as the predictors C to M. The multiple threshold buffers 706 may indicate matches for the different predictors, with VL prediction's from those predictors being transmitted to the pattern based prediction selector 708. The multiple threshold buffers 706 may control the pattern based prediction selector 708 so that the highest priority VL prediction that is available is transmitted to an output prediction selector 710. For example, when the threshold buffer for the predictor C and the threshold buffer for the predictor M both indicate a match (e.g., like the match signal 310), the threshold buffer for the predictor C may cause the pattern based prediction selector 708 to transmit the VL prediction from the predictor C (e.g., and not the VL prediction from the predictor M) to the output prediction selector 710 based on the higher priority of the predictor C. In some implementations, the number of bits associated with the multiple threshold buffers 706 may be configured by firmware (e.g., firmware could configure one or more of the multiple threshold buffers 706 to selectively use one or more of the entries, including in various patterns, to generate the match signals).

The decrement detection circuitry 704 may include prediction circuitry that detects decrements of an AVL, like the second prediction circuitry 400 and the third prediction circuitry 500. For example, the decrement detection circuitry 704 could implement the predictors A and B. The decrement detection circuitry 704 may include a history buffer 714 (e.g., storing "PrevAVL," like the history buffer 402 storing AVL'), a decrement buffer 716 (e.g., storing a delta, like the decrement buffer 416), a threshold buffer 718 (e.g., like the threshold buffer 408), a decrement based prediction selector 720, and wrap logic 722. The threshold buffer 718 may indicate a match signal (e.g., like the match signal 412) to the wrap logic 722. The wrap logic 722 may control the decrement based prediction selector 720 to select between a VL prediction that is a constant value (e.g., "Const"), a maximum value of the VL that may be available by hardware, or a value between the maximum value of the VL and zero (e.g., VLMAX<predicted_vl<0). Predicting a value between the maximum value of the VL and zero may enable the decrement detection circuitry 704 to predict how an innermost loop will end and wrap to a start of a next loop without missing a prediction. For example, the decrement detection circuitry 704 may provide a prediction when a last iteration is between VLMAX and zero (VLMAX<predicted_vl<0), and may predict whether the last VL goes directly to VLMAX to start a next innermost loop, whether the last VL goes to zero before starting the next iteration, or whether the last VL goes to some other constant value before starting the next iteration. The wrap logic 722 may control the decrement based prediction selector 720 so that the constant value, the maximum value, or the value between the maximum value and zero is transmitted to the output prediction selector 710.

The wrap logic 722 may also control the output prediction selector 710 to select between a first VL prediction generated by the pattern detection circuitry 702 and second VL prediction generated by the decrement detection circuitry 704. For example, the wrap logic 722 may select the first VL prediction when the first VL prediction is available (e.g., the first VL prediction generated by the pattern detection circuitry 702 may be prioritized over the second VL prediction generated by the decrement detection circuitry 704). The selected VL prediction (e.g., "PredVL," which could be the first VL prediction or the second VL prediction) could be the prediction for the VL that is provided used for the vector instruction (e.g., the VL prediction associated with the configuration instruction, provided prior to completion of execution of the configuration instruction).

Figure 8:
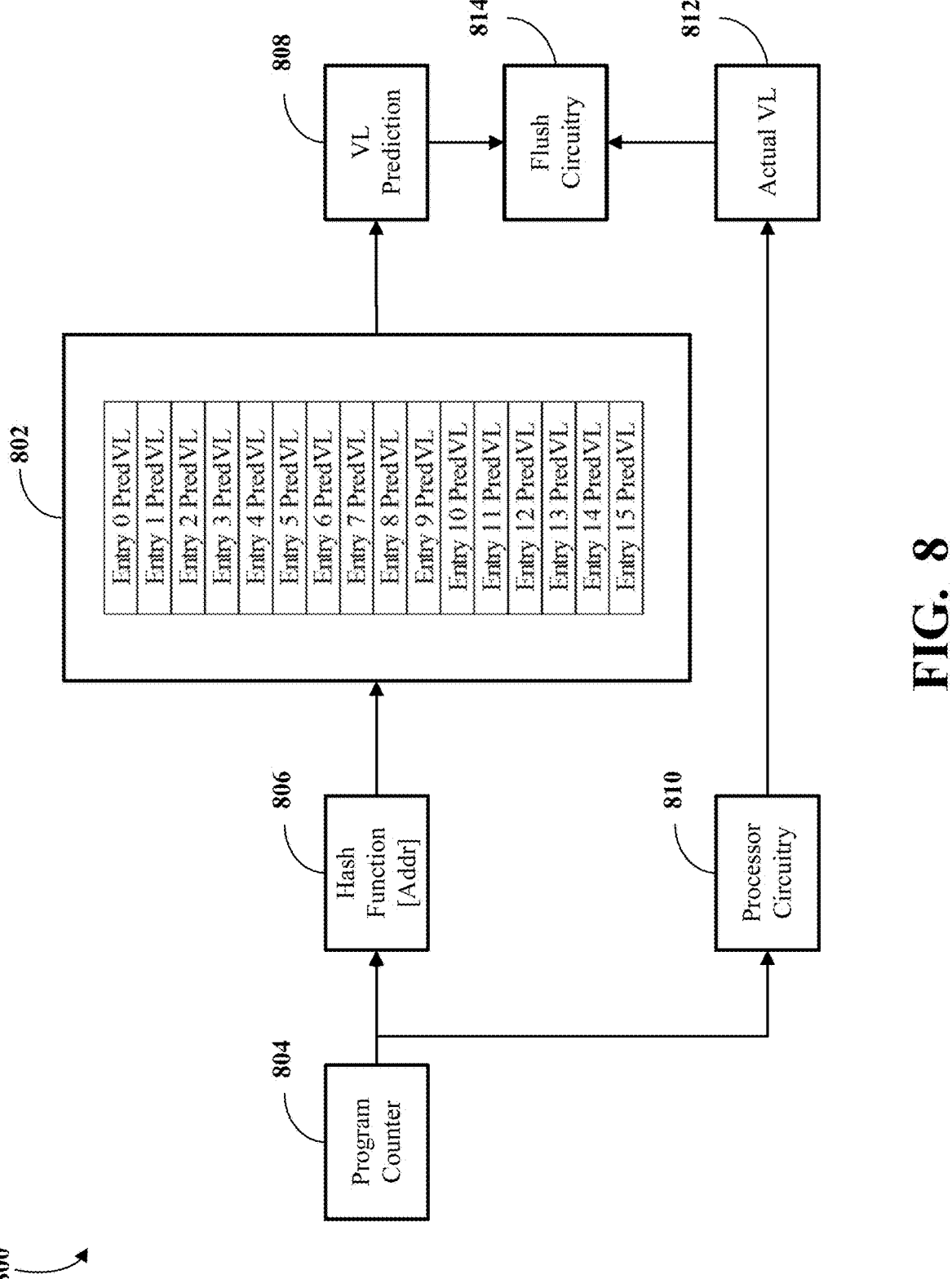
FIG. 8 is a block diagram of an example of a system for predicting a vector length associated with multiple configuration instructions at multiple addresses.

FIG. 8 is a block diagram of an example of a system 800 for predicting a VL associated with multiple configuration instructions at multiple addresses. The system 800 may include fifth prediction circuitry 802 including multiple entries (e.g., sixteen entries, such as Entry 0 to Entry 15). An entry in the fifth prediction circuitry 802 could correspond to an instance of prediction circuitry allocated for a configuration instruction at a specific address. For example, an entry in the fifth prediction circuitry 802 could include the first prediction circuitry 300, the second prediction circuitry 400, the third prediction circuitry 500, or the fourth prediction circuitry 700. In another example, an entry in the fifth prediction circuitry 802 could correspond to instances of one or more predictors, such as the predictors A to M shown in FIG. 6. An entry may generate a VL prediction 808 (e.g., "PredVL") associated with a configuration instruction at the address prior to completion of execution of the configuration instruction. Thus, the multiple entries (e.g., Entry 0 to Entry 15) may correspond to multiple configuration instructions at multiple addresses in a program.

An entry of the prediction circuitry may be tagged by an address associated with a configuration instruction in the program. For example, a program counter 804 may hold the address of a specific configuration instruction. A hash function 806 may be applied to the address associated to produce a hash value. The hash value may be used as an index to access the corresponding entry in the fifth prediction circuitry 802 (e.g., the entry may be tagged by the address or the hash value). A predicted VL may then be accessed from the corresponding entry as the VL prediction 808 for use associated with a vector instruction subsequent to the configuration instruction at another address in the program (e.g., for speculative execution of the vector instruction, based on the VL prediction 808, at a second address held by the program counter 804, to generate results).

Further, the configuration instruction, at the address held in the program counter 804, may also be executed by processor circuitry 810, including determining an actual VL 812 associated with the configuration instruction. For example, the actual VL 812 may be determined after speculative execution of the vector instruction (e.g., determining the actual VL 812 may cause a stall, during which time speculative execution of the vector instruction may complete). The VL prediction 808 may then be compared to the actual VL 812 by flush circuitry 814. If the VL prediction 808 and the actual VL 812 are different, the flush circuitry 814 may flush results generated by speculative execution of the vector instruction (e.g., based on the difference between the VL prediction 808 and the actual VL 812).

Figure 9:
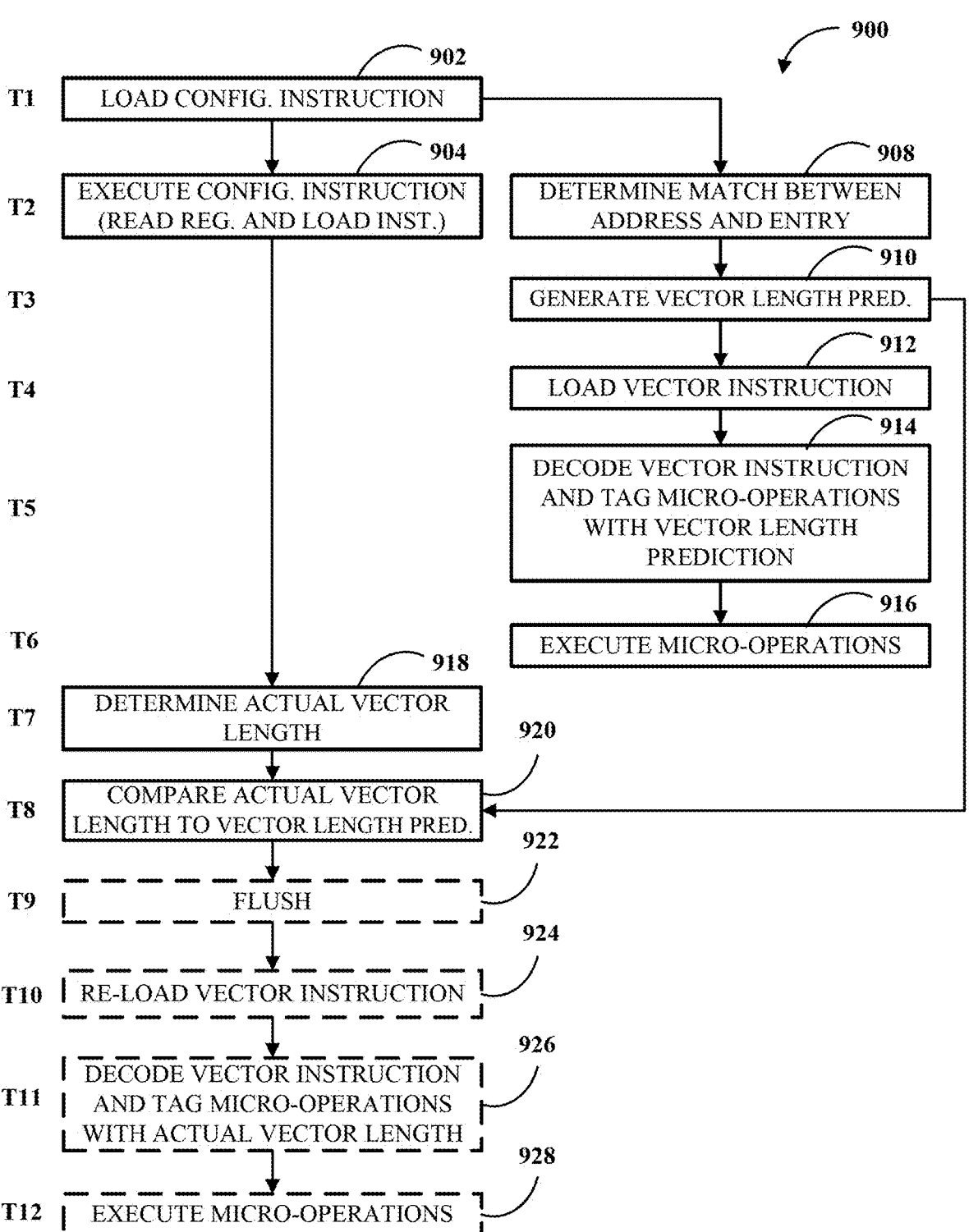
FIG. 9 is an example timing diagram associated with predicting a vector length.

FIG. 9 is an example timing diagram 900 associated with predicting a VL. At a first time period T1, at 902, a configuration instruction at a specific address in a program may be loaded. The address may be stored in a PC (e.g., the program counter 804, which may be associated with the scalar core of the processor). At a second time period T2, at 904, execution of the configuration instruction by processor circuitry (e.g., the processor circuitry 810) may begin, including decoding the configuration instruction so that the actual VL may be determined. For example, execution of the configuration instruction could involve the processor circuitry reading an integer register and executing a load instruction in the integer unit to determine the actual VL (e.g., the configuration instruction could be a dynamic configuration instruction).

Also, in the second time period T2, at 908, prediction circuitry (e.g., the fifth prediction circuitry 802) can determine whether the address associated with the configuration instruction matches an entry in the prediction circuitry (e.g., the fifth prediction circuitry 802). If the address does not match an entry in the prediction circuitry, then the prediction circuitry might not generate a VL prediction (e.g., the actual VL may be used to execute a vector instruction, with the actual VL being determined when execution of the configuration instruction completes). However, if the address does match an entry in the prediction circuitry, at the third time period T3, at 910, the prediction circuitry can generate the VL prediction associated with the configuration instruction (e.g., prior to completion of execution of the configuration instruction). At a fourth time period T4, at 912, having predicted the VL, the vector instruction subsequent to the configuration instruction in the program may be loaded. At a fifth time period T5, at 914, the vector instruction can be speculatively executed based on the VL prediction. For example, the vector instruction can be decoded into micro-operations which may be tagged based on the VL prediction, and at a sixth time period T6, at 916, the micro-operations may be speculatively executed based on the VL prediction.

At a seventh time period T7, at 918, the execution of the configuration instruction by the processor circuitry, from the third time period T3, may complete based on completion of the load instruction. This may enable determination of the actual VL for the configuration instruction. At an eighth time period T8, at 920, the actual VL may be compared to the VL prediction. If the actual VL and the VL prediction are the same, no further action may be necessary. However, if the actual VL and the VL prediction are different, at an ninth time period T9, at 922, a flush operation (shown with dashed lines) may commence where flush circuitry (e.g., the flush circuitry 814) can flush results generated by the speculative execution of the vector instruction based on the difference between the VL prediction and the actual VL. At a tenth time period T10, at 924, following the flush operation, the vector instruction subsequent to the configuration instruction in the program may be re-loaded. At an eleventh time period T11, at 926, the vector instruction can be re-executed based on the actual VL. For example, the vector instruction can be decoded into micro-operations which may be tagged based on the actual VL, and at a twelfth time period T12, at 928, the micro-operations may be re-executed based on the actual VL.

FIG. 10 is a flow chart of an example of a technique 1000 for predicting a VL associated with a configuration instruction. The technique 1000 can be executed using computing devices, such as the systems, hardware, and software described with respect to FIGS. 1-8. For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, prediction circuitry may generate a VL prediction associated with a configuration instruction prior to completion of execution of the configuration instruction. The VL may indicate a number of data elements on which a vector instruction subsequent to the configuration instruction in a program will operate. For example, first prediction circuitry 300, second prediction circuitry 400, third prediction circuitry 500, fourth prediction circuitry 700, or fifth prediction circuitry 802 may be used to predict the VL. Execution of the configuration instruction could include executing a load instruction to determine the VL which could result in a stall. As a result, predicting the VL may enable speculatively executing the vector instruction subsequent to the configuration instruction in the program to reduce latency. Execution of the configuration instruction could include decoding the vector instruction into one or more micro-operations and tagging the one or more micro-operations with the VL prediction generated by the prediction circuitry. Upon completion of execution of the configuration instruction, the actual VL may be determined and compared to the VL prediction so that a flush operation may occur if the actual VL does not match the VL prediction.

In some implementations, the prediction circuitry can predict not just the next VL, but multiple VL's ahead (e.g., N-ahead, where N is an integer greater than one). For example, the prediction circuitry can track the depth of predictions and forward predictions from an appropriate entry in a history buffer (e.g., the history buffer 302). In another example, the prediction circuitry can determine the decrement is consistent and calculate N-ahead.

FIG. 11 is a flow chart of an example of a technique 1100 for predicting a VL based on repeating pattern and predicting a VL based on a decrement behavior. The technique 1100 can be executed using computing devices, such as the systems, hardware, and software described with respect to FIGS. 1-8. For simplicity of explanation, the technique 1100 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1102, first prediction circuitry may generate a VL prediction for a configuration instruction by detecting a repeating pattern of VL's associated with earlier executions of the configuration instruction. For example, the first prediction circuitry 300 may be used to generate the VL prediction by detecting a repeating pattern of VL's. In another example, ones of the predictors C to L may be used to generate the VL prediction by detecting a repeating pattern of VL's. The prediction circuitry may include a history buffer (e.g., the history buffer 302, or the history buffer 705) and a threshold buffer (e.g., the threshold buffer 306, or one of the multiple threshold buffers 706). The history buffer may be configured to store one or more VL's resulting from one or more earlier executions of the configuration instruction. The threshold buffer may be configured to store one or more matches between VL's following executions of the configuration instruction.

At 1104, second prediction circuitry may be used to generate a VL prediction for a configuration instruction by detecting decrements of an AVL by a constant value or a maximum value of a VL. The AVL may indicate a group of data elements that is determined by the program. For example, the second prediction circuitry 400 may be used to generate the VL prediction by detecting decrements of the AVL by a constant value. In another example, the third prediction circuitry 500 may be used to generate the VL prediction by detecting decrements of the AVL by a maximum value of a VL. In another example, ones of the predictors A or B may be used to generate the VL prediction. The prediction circuitry may include a history buffer (e.g., the history buffer 402, or the history buffer 714) and a threshold buffer (e.g., the threshold buffer 408, or the threshold buffer 718). The history buffer may be configured to store an AVL resulting from an earlier execution of the configuration instruction. The threshold buffer may be configured to store one or more matches between decrements of the AVL following executions of the configuration instruction.

FIG. 12 is a flow chart of an example of a technique 1200 for predicting a VL by prioritizing multiple predictions. The technique 1200 can be executed using computing devices, such as the systems, hardware, and software described with respect to FIGS. 1-8. For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1202, prediction circuitry may generate one or more first VL predictions for a configuration instruction using one or more first predictors. For example, the first prediction circuitry 300 may generate the first VL prediction. In another example, one or more of the predictors C to M described in FIG. 4 may generate the one or more first VL predictions. In another example, the pattern detection circuitry 702 may generate a first VL prediction (e.g., which may be received by the pattern based prediction selector 708). In another example, an entry in the fifth prediction circuitry 802 (e.g., indexed by an address associated with the configuration instruction) may generate the one or more first VL predictions.

At 1204, the prediction circuitry may generate one or more second VL predictions using one or more second predictors. For example, the second prediction circuitry 400 or the third prediction circuitry 500 may generate the second VL prediction. In another example, one or more of the predictors A or B described in FIG. 4 may generate the one or more second VL predictions. In another example, the decrement detection circuitry 704 may generate the second VL prediction (e.g., which may be received by the decrement based prediction selector 720). In another example, an entry in the fifth prediction circuitry 802 (e.g., indexed by the address associated with the configuration instruction) may generate the one or more second VL predictions.

At 1206, the prediction circuitry may prioritize one or more of the first VL predictions over one or more of the second VL predictions when one or more first VL predictions are available. For example, when multiple ones of the predictors A to M are used, and multiple VL predictions are generated, a highest priority prediction of the VL that is available (e.g., generated by the highest priority predictor that is implemented) may be prioritized over other VL predictions. In another example, the multiple threshold buffers 706 may control the pattern based prediction selector 708 so that a highest priority VL prediction that is available is transmitted to the output prediction selector 710. The wrap logic 722 may control the output prediction selector 710 to select between a first VL prediction generated by the pattern detection circuitry 702 and second VL prediction generated by the decrement detection circuitry 704. The wrap logic 722 may select the first VL prediction when available (e.g., the first VL prediction generated by the pattern detection circuitry 702 may be prioritized over the second VL prediction generated by the decrement detection circuitry 704).

At 1208, the prediction circuitry may provide a prioritized VL prediction for the configuration instruction. For example, the wrap logic 722 may control the output prediction selector 710 so the prioritized VL prediction is generated for the configuration instruction. In another example, the entry in the fifth prediction circuitry 802 (e.g., indexed by an address associated with the configuration instruction) may provide the prioritized VL prediction (e.g., the VL prediction 808) for the configuration instruction.

FIG. 13 is a flow chart of an example of a technique 1300 for a flush operation. The technique 1300 can be executed using computing devices, such as the systems, hardware, and software described with respect to FIGS. 1-8. For simplicity of explanation, the technique 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1302, prediction circuitry may generate a VL prediction associated with a configuration instruction, and processor circuitry can speculatively execute a vector instruction based on the VL prediction. For example, the prediction circuitry 802 may generate the VL prediction 808 associated with the configuration instruction (e.g., at a first address in the program), and the processor circuitry 810 can speculatively execute the vector instruction (e.g., at a second address in the program), based on the VL prediction 808. For example, the prediction circuitry may generate a VL prediction associated with a configuration instruction according to step 1002 in FIG. 10.

At 1304, the processor circuitry can execute the configuration instruction, including determining an actual VL. For example, the processor circuitry 810 can complete execution of the configuration instruction (e.g., at the first address in the program) to determine the actual VL 812. The processor circuitry can complete execution of the configuration instruction while the vector instruction is speculatively executed based on the VL prediction. For example, the processor circuitry can speculatively execute the vector instruction while execution of the configuration instruction is stalled.

At 1306, flush circuitry can compare the VL prediction and the actual VL. For example, the flush circuitry 814 can compare the VL prediction 808 and the actual VL 812. The flush circuitry can compare the VL prediction and the actual VL to determine if they are different.

At 1308, the flush circuitry can flush results generated by speculative execution of the vector instruction, and re-execute the vector instruction based on the actual VL, based on a difference between the VL prediction and the actual VL. For example, in a flush operation, the flush circuitry 814 can flush results generated by speculative execution of the vector instruction (e.g., at the second address in the program), and re-execute the vector instruction (e.g., at the second address in the program) based on the actual VL 812, based on a difference between the VL prediction 808 and the actual VL 812.

Some implementations may include an apparatus that includes prediction circuitry that generates a vector length prediction associated with a configuration instruction prior to completion of execution of the configuration instruction, wherein the vector length prediction indicates a number of data elements on which a vector instruction will operate. In some implementations, execution of the configuration instruction includes executing a load instruction to determine an actual vector length. In some implementations, execution of the vector instruction includes decoding the vector instruction into one or more micro-operations and tagging the one or more micro-operations with the vector length prediction generated by the prediction circuitry. In some implementations, an entry of the prediction circuitry for generating the vector length prediction is tagged by an address associated with the configuration instruction in a program that includes the configuration instruction. In some implementations, the prediction circuitry generates the vector length prediction by detecting a repeating pattern of vector lengths associated with earlier executions of the configuration instruction. In some implementations, the prediction circuitry includes a history buffer and a threshold buffer, wherein the history buffer is configured to store one or more vector lengths resulting from one or more earlier executions of the configuration instruction and the threshold buffer is configured to store one or more matches between vector lengths following executions of the configuration instruction. In some implementations, the prediction circuitry generates the vector length prediction by detecting decrements of an application vector length by a constant value, wherein the application vector length indicates a group of data elements that is determined by a program that includes the configuration instruction. In some implementations, the prediction circuitry generates the vector length prediction by detecting decrements of an application vector length by a maximum value of the vector length, wherein the application vector length indicates a group of data elements that is determined by a program that includes the configuration instruction, and wherein the maximum value is based on a bit length of a vector register for storing one or more data elements of the number of data elements. In some implementations, the prediction circuitry includes a history buffer and a threshold buffer, wherein the history buffer is configured to store an application vector length resulting from an earlier execution of the configuration instruction, wherein the application vector length indicates a group of data elements that is determined by a program that includes the configuration instruction, and wherein the threshold buffer is configured to store one or more matches between decrements of the application vector length following executions of the configuration instruction. In some implementations, the vector length prediction is generated by using one or more first predictors configured to generate one or more first vector length predictions and one or more second predictors configured to generate one or more second vector length predictions with the one or more first vector length predictions being prioritized over the one or more second vector length predictions when the one or more first vector length predictions are available. In some implementations, the configuration instruction is a first configuration instruction of multiple configuration instructions at multiple addresses in a program with the prediction circuitry including multiple entries corresponding to the multiple configuration instructions at the multiple addresses. In some implementations, the apparatus may include processor circuitry configured to execute the configuration instruction including determining an actual vector length, and flush circuitry configured to flush results generated by speculative execution of the vector instruction based on a difference between the vector length prediction and the actual vector.

Some implementations may include a method that includes generating a vector length prediction associated with a configuration instruction prior to completion of execution of the configuration instruction, wherein the vector length prediction indicates a number of data elements on which a vector instruction will operate. In some implementations, execution of the configuration instruction includes executing a load instruction to determine an actual vector length. In some implementations, execution of the vector instruction includes decoding the vector instruction into one or more micro-operations and tagging the one or more micro-operations with the vector length prediction. In some implementations, the vector length prediction is generated based on an address associated with the configuration instruction in a program that includes the configuration instruction. In some implementations, the vector length prediction is generated by detecting a repeating pattern of vector lengths associated with earlier executions of the configuration instruction. In some implementations, the vector length prediction is generated by using a history buffer and a threshold buffer, wherein the history buffer is configured to store one or more vector lengths resulting from one or more earlier executions of the configuration instruction and the threshold buffer is configured to store one or more matches between vector lengths following executions of the configuration instruction. In some implementations, the vector length prediction is generated by detecting decrements of an application vector length by a constant value, wherein the application vector length indicates a group of data elements that is determined by a program that includes the configuration instruction. In some implementations, the vector length prediction is generated by detecting decrements of an application vector length by a maximum value of the vector length, wherein the application vector length indicates a group of data elements that is determined by a program that includes the configuration instruction, and wherein the maximum value is based on a bit length of a vector register for storing one or more data elements of the number of data elements. In some implementations, the vector length prediction is generated by using a history buffer and a threshold buffer, wherein the history buffer is configured to store an application vector length resulting from an earlier execution of the configuration instruction, wherein the application vector length indicates a group of data elements that is determined by a program that includes the configuration instruction, and wherein the threshold buffer is configured to store one or more matches between decrements of the application vector length following executions of the configuration instruction. In some implementations, the vector length prediction is generated by using one or more first predictors configured to generate one or more first vector length predictions and one or more second predictors configured to generate one or more second vector length predictions with the one or more first vector length predictions being prioritized over the one or more second vector length predictions when the one or more first vector length predictions are available. In some implementations, the configuration instruction is a first configuration instruction of multiple configuration instructions at multiple addresses in a program and the vector length prediction is generated based on an entry of multiple entries corresponding to the first configuration instruction. In some implementations, the method may include executing the configuration instruction, including determining an actual vector length, and flushing results generated by speculative execution of the vector instruction based on a difference between the vector length prediction and the actual vector length.

Some implementations may include a non-transitory computer readable medium comprising a circuit representation that, when processed by a computer, is used to program or manufacture an integrated circuit comprising prediction circuitry that generates a vector length prediction associated with a configuration instruction prior to completion of execution of the configuration instruction, wherein the vector length prediction indicates a number of data elements on which a vector instruction will operate. In some implementations, execution of the configuration instruction includes executing a load instruction to determine an actual vector length. In some implementations, execution of the vector instruction includes decoding the vector instruction into one or more micro-operations and tagging the one or more micro-operations with the vector length prediction generated by the prediction circuitry. In some implementations, an entry of the prediction circuitry for generating the vector length prediction is tagged by an address associated with the configuration instruction in a program that includes the configuration instruction. In some implementations, the prediction circuitry generates the vector length prediction by detecting a repeating pattern of vector lengths associated with earlier executions of the configuration instruction. In some implementations, the prediction circuitry includes a history buffer and a threshold buffer, wherein the history buffer is configured to store one or more vector lengths resulting from one or more earlier executions of the configuration instruction and the threshold buffer is configured to store one or more matches between vector lengths following executions of the configuration instruction. In some implementations, the prediction circuitry generates the vector length prediction by detecting decrements of an application vector length by a constant value, wherein the application vector length indicates a group of data elements that is determined by a program that includes the configuration instruction. In some implementations, the prediction circuitry generates the vector length prediction by detecting decrements of an application vector length by a maximum value of the vector length, wherein the application vector length indicates a group of data elements that is determined by a program that includes the configuration instruction, and wherein the maximum value is based on a bit length of a vector register for storing one or more data elements of the number of data elements. In some implementations, the prediction circuitry includes a history buffer and a threshold buffer, wherein the history buffer is configured to store an application vector length resulting from an earlier execution of the configuration instruction, wherein the application vector length indicates a group of data elements that is determined by a program that includes the configuration instruction, and wherein the threshold buffer is configured to store one or more matches between decrements of the application vector length following executions of the configuration instruction. In some implementations, the vector length prediction is generated by using one or more first predictors configured to generate one or more first vector length predictions and one or more second predictors configured to generate one or more second vector length predictions with the one or more first vector length predictions being prioritized over the one or more second vector length predictions when the one or more first vector length predictions are available. In some implementations, the configuration instruction is a first configuration instruction of multiple configuration instructions at multiple addresses in a program with the prediction circuitry including multiple entries corresponding to the multiple configuration instructions at the multiple addresses. In some implementations, processor circuitry is configured to execute the configuration instruction, including determining an actual vector length, and flush circuitry is configured to flush results generated by speculative execution of the vector instruction based on a difference between the vector length prediction and the actual vector length.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus, comprising:
   prediction circuitry that generates a vector length prediction associated with a configuration instruction prior to completion of execution of the configuration instruction, wherein the vector length prediction indicates a number of data elements on which a vector instruction will operate.

2. The apparatus of claim 1, wherein execution of the configuration instruction includes executing a load instruction to determine an actual vector length.

3. The apparatus of claim 1, wherein execution of the vector instruction includes decoding the vector instruction into one or more micro-operations and tagging the one or more micro-operations with the vector length prediction generated by the prediction circuitry.

4. The apparatus of claim 1, wherein an entry of the prediction circuitry for generating the vector length prediction is tagged by an address associated with the configuration instruction in a program that includes the configuration instruction.

5. The apparatus of claim 1, wherein the prediction circuitry generates the vector length prediction by detecting a repeating pattern of vector lengths associated with earlier executions of the configuration instruction.

6. The apparatus of claim 1, wherein the prediction circuitry includes a history buffer and a threshold buffer, wherein the history buffer is configured to store one or more vector lengths resulting from one or more earlier executions of the configuration instruction and the threshold buffer is configured to store one or more matches between vector lengths following executions of the configuration instruction.

7. The apparatus of claim 1, wherein the prediction circuitry generates the vector length prediction by detecting decrements of an application vector length by a constant value, wherein the application vector length indicates a group of data elements that is determined by a program that includes the configuration instruction.

8. The apparatus of claim 1, wherein the prediction circuitry generates the vector length prediction by detecting decrements of an application vector length by a maximum value of a vector length, wherein the application vector length indicates a group of data elements that is determined by a program that includes the configuration instruction, and wherein the maximum value is based on a bit length of a vector register for storing one or more data elements of the number of data elements.

9. The apparatus of claim 1, wherein the prediction circuitry includes a history buffer and a threshold buffer, wherein the history buffer is configured to store an application vector length resulting from an earlier execution of the configuration instruction, wherein the application vector length indicates a group of data elements that is determined by a program that includes the configuration instruction, and wherein the threshold buffer is configured to store one or more matches between decrements of the application vector length following executions of the configuration instruction.

10. The apparatus of claim 1, wherein the vector length prediction is generated by using one or more first predictors configured to generate one or more first vector length predictions and one or more second predictors configured to generate one or more second vector length predictions with the one or more first vector length predictions being prioritized over the one or more second vector length predictions when the one or more first vector length predictions are available.

11. The apparatus of claim 1, wherein the configuration instruction is a first configuration instruction of multiple configuration instructions at multiple addresses in a program with the prediction circuitry including multiple entries corresponding to the multiple configuration instructions at the multiple addresses.

12. The apparatus of claim 1, further comprising:

processor circuitry configured to execute the configuration instruction including determining an actual vector length; and flush circuitry configured to flush results generated by speculative execution of the vector instruction based on a difference between the vector length prediction and the actual vector length.

13. A method, comprising:

generating a vector length prediction associated with a configuration instruction prior to completion of execution of the configuration instruction, wherein the vector length prediction indicates a number of data elements on which a vector instruction will operate.

14. The method of claim 13, wherein execution of the configuration instruction includes executing a load instruction to determine an actual vector length.

15. The method of claim 13, wherein the vector length prediction is generated by detecting a repeating pattern of vector lengths associated with earlier executions of the configuration instruction.

16. The method of claim 13, wherein the vector length prediction is generated by using a history buffer and a threshold buffer, wherein the history buffer is configured to store one or more vector lengths resulting from one or more earlier executions of the configuration instruction and the threshold buffer is configured to store one or more matches between vector lengths following executions of the configuration instruction.

17. The method of claim 13, wherein the vector length prediction is generated by detecting decrements of an application vector length by a maximum value of a vector length, wherein the application vector length indicates a group of data elements that is determined by a program that includes the configuration instruction, and wherein the maximum value is based on a bit length of a vector register for storing one or more data elements of the number of data elements.

18. The method of claim 13, wherein the vector length prediction is generated by using a history buffer and a threshold buffer, wherein the history buffer is configured to store an application vector length resulting from an earlier execution of the configuration instruction, wherein the application vector length indicates a group of data elements that is determined by a program that includes the configuration instruction, and wherein the threshold buffer is configured to store one or more matches between decrements of the application vector length following executions of the configuration instruction.

19. The method of claim 13, wherein the vector length prediction is generated by using one or more first predictors configured to generate one or more first vector length predictions and one or more second predictors configured to generate one or more second vector length predictions with the one or more first vector length predictions being prioritized over the one or more second vector length predictions when the one or more first vector length predictions are available.

20. A non-transitory computer readable medium comprising a circuit representation that, when processed by a computer, is used to program or manufacture an integrated circuit comprising:

prediction circuitry that generates a vector length prediction associated with a configuration instruction prior to completion of execution of the configuration instruction, wherein the vector length prediction indicates a number of data elements on which a vector instruction will operate.

* * * * *